US 6,742,545 B2

(12) United States Patent
Fisher et al.

(10) Patent No.: US 6,742,545 B2
(45) Date of Patent: Jun. 1, 2004

(54) HOSE CONSTRUCTION

(75) Inventors: William C. Fisher, Cuyahoga Falls, OH (US); Michael R. Swails, Madison, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/124,913

(22) Filed: Apr. 18, 2002

(65) Prior Publication Data

US 2002/0112770 A1 Aug. 22, 2002

Related U.S. Application Data

(63) Continuation-in-part of application No. 09/466,375, filed on Dec. 17, 1999, now Pat. No. 6,390,141
(60) Provisional application No. 60/113,098, filed on Dec. 21, 1998.

(51) Int. Cl.$^7$ ................................. F16L 11/08
(52) U.S. Cl. ..................... 138/137; 138/133; 138/127; 138/125; 138/126
(58) Field of Search ................... 138/126, 123, 138/124, 125, 127, 129, 133, 132, 172

(56) References Cited

U.S. PATENT DOCUMENTS

| | | | |
|---|---|---|---|
| 2,981,982 A | 5/1961 | Pendorf | 264/269 |
| 3,528,457 A | 9/1970 | Martin et al. | 138/132 |
| 3,554,237 A | 1/1971 | Pelley et al. | 138/122 |
| 3,557,873 A | 1/1971 | Owens | 166/274 |
| 3,566,924 A | 3/1971 | Ambrus et al. | 138/130 |
| 3,607,517 A | 9/1971 | Pelley et al. | 156/195 |
| 3,637,015 A | 1/1972 | Holm | 166/273 |
| 3,682,202 A | 8/1972 | Buhrmann et al. | 138/126 |
| 3,729,028 A | 4/1973 | Horvath et al. | 138/130 |
| 3,773,090 A | 11/1973 | Ghersa et al. | 138/141 |

(List continued on next page.)

FOREIGN PATENT DOCUMENTS

| | | |
|---|---|---|
| DE | 1157 862 | 11/1963 |
| DE | 84 32 442.2 | 7/1986 |
| DE | 41 18 023 | 12/1991 |
| DE | 2 779 798 | 12/1999 |
| EP | 0 192 922 | 9/1986 |
| EP | 0 937 933 | 8/1999 |
| WO | 00/37841 | 6/2000 |

OTHER PUBLICATIONS

Catalog 693 of Superflex Ltd., Manufacturer of P.V.C. Flexible Reinforced Hoses (undated).

Equipment Engineering—"Industry Gearing for Longer, More Complex Umbilicals", authored by Jeremy Beckman Oct., 1999.

"Vary Expansion Rate Within Power Steering Pressure Hose", Research Disclosure, Kenneth Mason Publications, Hampshire, GB, No. 417, Jan. 1999, p. 62 XP–000888430.

Copy of Notification of the International Search Report from corresponding PCT application PCT/US03/08756.

Copy of the International Search Report filed in PCT/US99/30054, corresponding to the within matter.

*Primary Examiner*—Patrick Brinson
(74) *Attorney, Agent, or Firm*—John A. Molnar, Jr.

(57) ABSTRACT

A flexible hose construction adapted for conveying fluids under pressures and capable of withstanding relatively high external pressures without collapsing. The tubular construction includes a first reinforcement layer, an inner jacket surrounding the first reinforcement layer, a second reinforcement layer surrounding the inner jacket, and outer jacket covering the second reinforcement layer.

39 Claims, 5 Drawing Sheets

U.S. PATENT DOCUMENTS

| | | | |
|---|---|---|---|
| 3,779,308 A | 12/1973 | Buhrmann et al | 138/125 |
| 3,791,415 A | 2/1974 | Lawless et al. | 138/127 |
| 3,811,501 A | 5/1974 | Burnett et al. | 166/252 |
| 3,847,693 A | 11/1974 | Ghersa et al. | 156/79 |
| 3,858,617 A * | 1/1975 | Takada | 138/141 |
| 3,871,408 A | 3/1975 | Wood et al. | 138/137 |
| 3,889,716 A | 6/1975 | Linhart | 138/129 |
| 3,890,181 A | 6/1975 | Stent et al. | 156/143 |
| 3,908,703 A | 9/1975 | Bournazel et al. | 139/120 |
| 3,911,959 A | 10/1975 | Frank | 138/36 |
| 3,998,986 A | 12/1976 | Williams | 428/102 |
| 4,000,759 A | 1/1977 | Higbee | 138/130 |
| 4,036,564 A | 7/1977 | Richards | 417/344 |
| 4,096,888 A * | 6/1978 | Stefano et al. | 138/125 |
| 4,098,298 A | 7/1978 | Vohrer | 138/122 |
| 4,111,237 A * | 9/1978 | Mutzner et al. | 138/125 |
| 4,157,101 A | 6/1979 | Ross | 138/130 |
| 4,175,992 A | 11/1979 | Grawey | 138/129 X |
| 4,182,019 A | 1/1980 | Tally et al. | 29/453 |
| 4,190,088 A | 2/1980 | Lalikos et al. | 138/126 |
| 4,213,485 A | 7/1980 | Ottewell et al. | 138/130 |
| 4,241,763 A | 12/1980 | Antal et al. | 138/127 |
| 4,259,989 A | 4/1981 | Lalikos et al. | 138/109 |
| 4,259,991 A | 4/1981 | Kutnyak | 138/127 |
| 4,294,636 A | 10/1981 | Vitellaro | 156/143 |
| 4,295,496 A * | 10/1981 | Bixby | 138/122 |
| 4,299,286 A | 11/1981 | Alston | 166/274 |
| 4,304,266 A | 12/1981 | Kutnyak et al. | 138/129 |
| 4,342,612 A | 8/1982 | Lalikos et al. | 138/121 X |
| 4,380,252 A | 4/1983 | Gray et al. | 138/125 |
| 4,384,595 A | 5/1983 | Washkewicz et al. | 138/127 |
| 4,396,797 A | 8/1983 | Sakuragi et al. | 138/110 X |
| 4,431,031 A * | 2/1984 | Ettlinger | 138/109 |
| 4,444,707 A | 4/1984 | Schwarz | 264/103 |
| 4,456,034 A | 6/1984 | Bixby | 138/122 |
| 4,459,168 A | 7/1984 | Anselm | 156/143 |
| 4,463,779 A | 8/1984 | Wink et al. | 138/125 |
| 4,474,217 A | 10/1984 | DeMarse et al. | 138/137 |
| 4,522,235 A | 6/1985 | Kluss et al. | 138/130 |
| 4,537,222 A | 8/1985 | Schwarz | 138/130 |
| 4,553,568 A | 11/1985 | Piccoli et al. | 138/125 |
| 4,558,740 A | 12/1985 | Yellig, Jr. | 166/272 |
| 4,585,035 A | 4/1986 | Piccoli | 138/127 |
| 4,605,066 A | 8/1986 | Djabbarah | 166/268 |
| 4,609,043 A | 9/1986 | Cullick | 166/268 |
| 4,620,569 A | 11/1986 | von Glanstatten et al. | 138/132 |
| 4,644,977 A | 2/1987 | Arterburn | 138/137 |
| 4,654,096 A | 3/1987 | Jant et al. | 156/149 |
| 4,673,002 A | 6/1987 | Scanlon et al. | 138/149 |
| 4,678,036 A | 7/1987 | Hartman et al. | 166/273 |
| 4,679,600 A | 7/1987 | Dougherty | 138/128 |
| 4,706,712 A | 11/1987 | Oglesby et al. | 138/126 |
| 4,706,713 A * | 11/1987 | Sadamitsu et al. | 138/129 X |
| 4,737,153 A * | 4/1988 | Shimamura et al. | 604/526 |
| 4,737,210 A | 4/1988 | Dougherty | 156/148 |
| 4,739,801 A | 4/1988 | Kimura et al. | 138/120 |
| 4,800,957 A | 1/1989 | Stevens, Jr. et al. | 166/268 |
| 4,850,395 A | 7/1989 | Briggs | 138/30 |
| 4,862,924 A | 9/1989 | Kanao | 138/144 |
| 4,871,004 A | 10/1989 | Brown et al. | 152/209.4 |
| 4,899,817 A | 2/1990 | Djabbarah | 166/252 |
| 4,952,262 A | 8/1990 | Washkewicz et al. | 156/149 |
| 5,024,252 A | 6/1991 | Ochsner | 138/130 |
| 5,062,456 A | 11/1991 | Cooke et al. | 138/125 |
| 5,076,329 A | 12/1991 | Brunnhofer | 138/137 |
| 5,143,123 A | 9/1992 | Richards et al. | 138/120 |
| 5,157,083 A | 10/1992 | Aonuma et al. | 525/285 |
| 5,167,259 A | 12/1992 | Brunnhofer | 138/137 |
| 5,284,184 A | 2/1994 | Noone et al. | 138/121 |
| 5,383,087 A | 1/1995 | Noone et al. | 138/137 X |
| 5,419,374 A | 5/1995 | Nawrot et al. | 138/137 |
| 5,445,191 A * | 8/1995 | Green et al. | 138/126 |
| 5,460,771 A | 10/1995 | Mitchell et al. | 264/508 |
| 5,469,892 A | 11/1995 | Noone et al. | 138/121 |
| 5,500,257 A | 3/1996 | Krause et al. | 427/487 |
| 5,554,425 A | 9/1996 | Krause et al. | 138/118 X |
| 5,566,720 A | 10/1996 | Cheney et al. | 138/137 |
| 5,622,210 A | 4/1997 | Crisman et al. | 138/104 |
| 5,632,336 A | 5/1997 | Notz et al. | 166/402 |
| 5,647,400 A * | 7/1997 | Jani et al. | 138/141 X |
| 5,660,210 A * | 8/1997 | Ikeda et al. | 138/126 |
| 5,678,611 A | 10/1997 | Noone et al. | 138/137 |
| 5,690,146 A | 11/1997 | Stammen | 138/36 |
| 5,698,278 A | 12/1997 | Emond et al. | 428/34.5 |
| 5,743,304 A | 4/1998 | Mitchell et al. | 138/137 |
| 5,778,940 A | 7/1998 | Tucker et al. | 138/127 |
| 5,899,237 A | 5/1999 | Akedo et al. | 138/129 |
| 5,996,642 A * | 12/1999 | Noone et al. | 138/141 X |
| 6,112,771 A | 9/2000 | Anyagi et al. | 138/127 |
| 6,158,476 A * | 12/2000 | Sjotun | 138/126 |
| 6,220,304 B1 * | 4/2001 | Horiba et al. | 138/126 |
| 6,336,473 B1 | 1/2002 | Lord | 138/125 |
| 6,390,141 B1 * | 5/2002 | Fisher et al. | 138/137 |
| 6,450,206 B2 * | 9/2002 | Ishikawa et al. | 138/126 |
| 2001/0039972 A1 | 11/2001 | Badders et al. | |

\* cited by examiner

HOSE CONSTRUCTION

CROSS-REFERENCE TO RELATED APPLICATION

This application is a continuation-in-part of U.S. application Ser. No. 09/466,375, Dec. 17, 1999, and claiming priority to U.S. provisional application Serial No. 60/113,098, filed Dec. 21, 1998, now U.S. Pat. No. 6,390,141 entitled "Collapse-Resistant Hose Construction," the disclosures of which are expressly incorporated herein by reference.

BACKGROUND OF THE INVENTION

The present invention relates broadly to a flexible, high pressure reinforced, preferably thermoplastic hose construction, and more particularly to such a collapse-resistant or other hose construction which is especially adapted for use in offshore oil drilling applications or other harsh service environments.

Flexible high-pressure and ultra high-pressure hose is used in a variety of fluid transfer applications such as in oil field and offshore hydraulic applications. For example, in the recovery of crude oil from subterranean reservoirs, shale, or other formations, a substantial amount of oil may remain uncovered at the completion of primary recovery operations such as natural depletion. Secondary methods therefore often are used to increase the recovery yield. One of the more successful of these methods is that of miscible flooding wherein a solvent such as methanol is injected into the formation. The crude oil, which is miscible with the solvent, is displaced from the formation by the solvent and is extracted therewith from the formation. Secondary oil recovery methods are further described in U.S. Pat. Nos. 3,557,873; 3,637,015; 3,811,501; 4,299,286; 4,558,740; 4,605,066; 4,609,043; 4,678,036; 4,800,957; 4,899,817; and 5,632,336. Another such method is immiscible recovery wherein brine or water is substituted for the solvent.

In general, hoses adapted for solvent injection and other oil field applications not only must be flexible, i.e., kink resistant at a relatively small bend radius, but also must be capable of withstanding high and ultra high internal pressures and of being manufacturable in relatively long continuous lengths of 6000 feet (1830 m) or more. As used herein, "high-pressure" is ascribed its common trade definition of hydraulic working pressures greater than about 1500 psi (10 MPa), with "ultra" high being used herein to designate working pressures greater than about 15,000 psi (100 MPa) or more. For deep sea oil recovery and other underwater service, such hoses further must be capable of withstanding external pressures of 500–14000 psi (3.4–28 MPa) or more, be lightweight, and abrasion resistant, and for solvent injection applications additionally must be resistant to permeation by methanol or other solvents.

In basic structure, hoses of the type herein involved conventionally are constructed as having a tubular core surrounded by one or more reinforcement layers or courses of high tensile strength steel wire and/or synthetic fiber. The reinforcement layers, in turn, are protected by a surrounding outer sheath or cover which may be of the same or different material as the core tube. The cover also provides the hose with increased abrasion resistance.

The core tube, which may be a thermoplastic material such as a polyamide, polyolefin, polyvinyl chloride, or polyurethane, or a synthetic rubber material such as Buna-N or neoprene, is conventionally extruded and cooled or cured. As is detailed in U.S. Pat. Nos. 3,116,760; 3,159,183; 3,966,238; 4,952,262, if necessary, the tube may be cross-head extruded over a mandrel for support, or otherwise supported in later forming operations using air pressure and/or reduced processing temperatures.

From the extruder, the tube may be collected on a reel or other take-up device for further processing. As dispensed from the reel, the tube optionally next may be passed through an applicator for its coating with an outer layer of an adhesive material which, in the case of thermoplastic hose, may be a polyurethane or other isocyanate-based adhesive, or, in the case of "rubber," i.e., vulcanizable elastomeric, hose, a vulcanizable adhesion promoter. The core tube then may be delivered through a braider and/or a spiral winder for its reinforcement with one or more surrounding layers of wire and/or fibrous material such as a monofilament, yarn, or roving. These reinforcement layers, which are applied under tension and which may be bonded to the core and to adjacent reinforcement layers, typically comprise an interwoven braid or a spiral winding of a nylon, polyester, or aramid yarn, or a high tensile steel or other metal wire.

Following the application of the reinforcement layers, the outer cover or sheath optionally may be applied. Such cover, which may be formed as a cross-head extrusion or a spiral-wound wrapping, typically comprises an abrasion-resistant polymeric material such as a polyamide, polyolefin, polyvinyl chloride, or polyurethane. As before, an adhesive layer may be used to bond the outer cover to the reinforcement layers.

Representative high-pressure spiral wound and other hose constructions, as well as manufacturing methods therefor, are shown in U.S. Pat. Nos. 1,281,557; 3,566,924; 3,654,967; 3,682,202; 3,779,308; 3,790,419; 3,791,415; 3,805,848; 3,889,716; 3,890,181; 3,905,398; 4,000,759; 4,098,298; 4,175,992; 4,182,019; 4,241,763; 4,259,991; 4,294,636; 4,304,266; 4,317,000; 4,342,612; 4,343,333; 4,380,252; 4,384,595; 4,444,707; 4,456,034; 4,459,168; 4,463,779; 4,522,235; 4,537,222; 4,553,568; 4,585,035; 4,699,178; 4,850,395; 4,898,212; 4,952,262; 5,024,252; 5,062,456; 5,361,806; 5,698,278; and 5,778,940. Heretofore, however, it is believed that a high or ultra high pressure hose, that is, having a working pressure of 10 MPa or more, which was both flexible and highly collapse resistant, as well as resistant to solvent permeation, was unknown in the art. That is, although flexible high pressure hoses heretofore have been made collapse-resistant via, as is shown generally in U.S. Pat. No. 4,456,034, the incorporation of a helically-wound spring received internally within the core tube bore, it is believed that such springs would not be useful in conjunction with multi-layer core tubes which include an inner liner or barrier layer of a fluoropolymer or other chemically-resistant material. In this regard, there would exist at least the potential for the spring to wear through the barrier layer as the hose is subject to flexural forces. Such springs also are known to decrease with the flexibility of the hose, to introduce an objectionable flow restriction into the bore of the hose which is of particular concern as the length of the hose increases, to require a secondary operation for insertion, and to limit the continuous length in which the hose can be manufactured. Other constructions employing an armor instead of a spring similarly introduce a flow restriction and also result in a bend radius which is limited by the pitch of the armor.

In view of the foregoing, it will be appreciated that high pressure hose constructions must exhibit a demanding balance of mechanical and other physical properties for proper performance. Indeed, as commercial applications for high pressure hoses have increased as a less labor intensive and, therefore, more economical substitute for rigid metal pipe, there have been calls from industry for further improvements in such hoses and in the materials of construction therefor. Especially desired would be a construction which is flexible, yet resistant to external pressure collapse in critical applications such as deep sea oil recovery and oil field applications.

BROAD STATEMENT OF THE INVENTION

The present invention is directed to a flexible hose construction, and particularly to a reinforcement structure therefor, adapted for conveying fluids under relatively high internal working pressures of from about 15,000 psi (10 MPa) to about 15,000 psi (100 MPa) or higher which also is resistant to collapse at relatively high external pressures of between about 500–500–14000 psi (3.4–28 MPa), or from vacuum. Accordingly, the hose construction of the invention is particularly adapted for underwater oil recovery and other offshore applications, and may be used for both suction and discharge applications.

Advantageously, the hose of the present invention may include a structural collapse-resistant, shape-restoring element which is incorporated into the wall structure of the hose rather than being disposed internally within the hose bore. In this regard, the hose is constructed as including a tubular first elastomeric layer having a first inner radial surface and a first outer radial surface, and a tubular second elastomeric layer having a second inner radial surface and a second outer radial surface. A reinforcement helix, which may be a spiral of one or more ends of a monofilament steel or other metal wire, is wound over the first elastomeric layer as interposed between that layer and the second elastomeric layer. The element is spiral wound at a predetermined pitch angle to define a series of turns each being spaced-apart from an adjacent turn to define an interstitial area therebetween. The first and second elastomeric members each extends into the interstitial area with the first outer radial surface of the first elastomeric member being bonded, by fusion or other means, to the second inner radial surface of the second elastomeric member such that the helical reinforcement element is encapsulated therebetween. As encapsulated between the first and second elastomeric layers, the spring-like helical element is able to resist externally-imposed forces without elongating, compressing, flexing, or otherwise causing the hose to deform into an elliptical or other non-circular geometry. Moreover, the encapsulation of the helically-wound element additionally provides a smooth and efficient load transferring surface over which subsequent fibrous reinforcement layers may be braided or spiral wound to improve the internal pressure resistance of the hose.

In an illustrated embodiment, the hose construction of the present invention includes a tubular core over which the first elastomeric layer is superimposed, two or more fibrous reinforcement layers braided or wound over the second elastomeric layer to provide resistance to internal pressure, a primary cover surround the outermost reinforcement layer, and a secondary cover interposed between the innermost reinforcement layer and the outermost reinforcement layer. The secondary cover functions as an internal barrier against the ingress of sea water or other fluids should the primary cover be damaged or removed.

The present invention, accordingly, comprises the apparatus possessing the construction, combination of elements, and arrangement of parts which are exemplified in the detailed disclosure to follow. Advantages of the present invention include a hose construction which is light-weight, abrasion-resistant, and flexible, but which also performs under conditions of high internal and high net external pressures so as to be highly resistant both to kinking and to collapse from externally-imposed forces such as underwater pressure or from vacuum. Additional advantages include a collapse-resistant, high pressure hose construction which is manufacturable in relatively long lengths of 6,000–10,000 feet or more, and which further is particularly adapted for solvent flooding and other solvent transfer applications when used in conjunction with a composite core tube having an inner liner which is resistant to solvent permeation. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
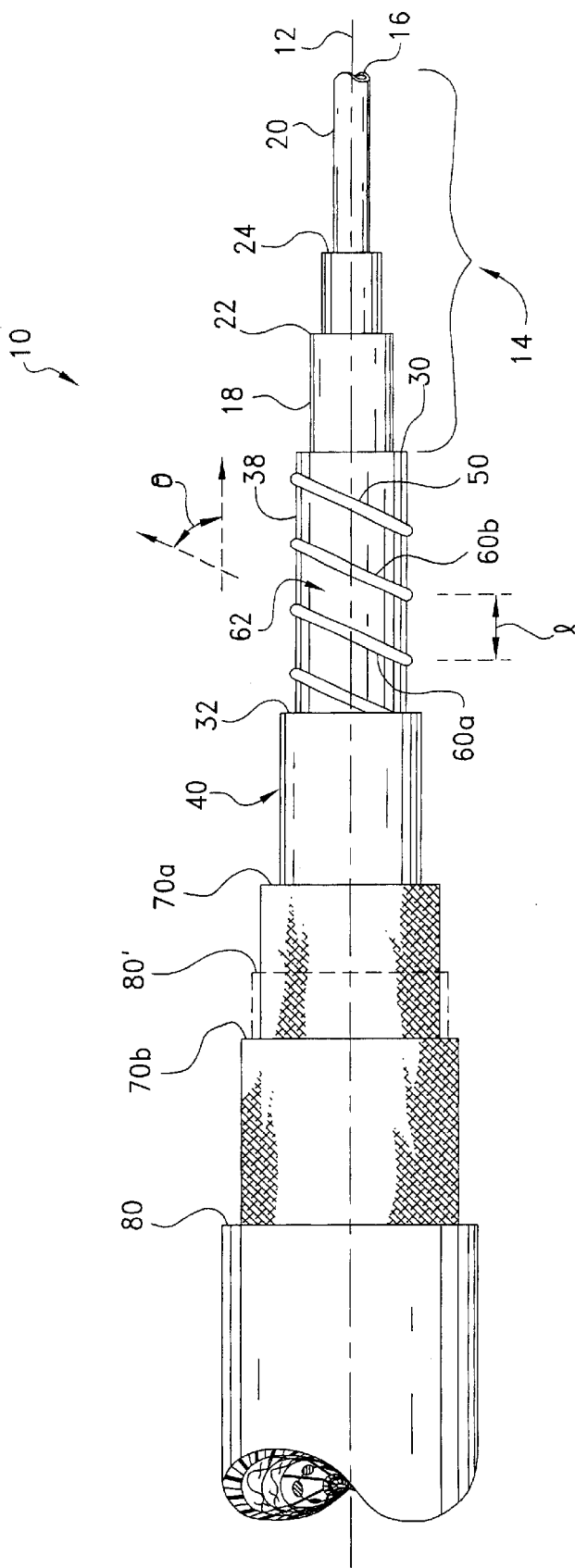
FIG. 1 is a side elevational, cut-away view of a representative flexible, collapse-resistant high pressure hose constructed in accordance with the present invention as including a helically wound reinforcement element which is encapsulated within a first and second elastomeric layer.

The drawings will be described further in connection with the following Detailed Description of the Invention

DETAILED DESCRIPTION OF THE INVENTION

Certain terminology may be employed in the description to follow for convenience rather than for any limiting purpose. For example, the terms "upper" and "lower" designate directions in the drawings to which reference is made, with the terms "inner" or "interior" and "outer" or "exterior" referring, respectively, to directions toward and away from the center of the referenced element, and the terms "radial" and "axial" referring, respectively, to directions perpendicular and parallel to the longitudinal central axis of the referenced element. Terminology of similar import other than the words specifically mentioned above likewise is to be considered as being used for purposes of convenience rather than in any limiting sense.

For the purposes of the discourse to follow, the precepts of the invention herein involved are described in connection with its utilization within a representative hose construction adapted particularly for use in solvent flooding or other solvent transfer applications. It will be appreciated, however, that aspects of the present invention may find use in other hose constructions for high pressure fluid conveying such as other oil recovery or offshore hydraulics applications, or for suction or other vacuum applications.

Use within those such other applications therefore should be considered to be expressly within the scope of the present invention.

Figure 2:
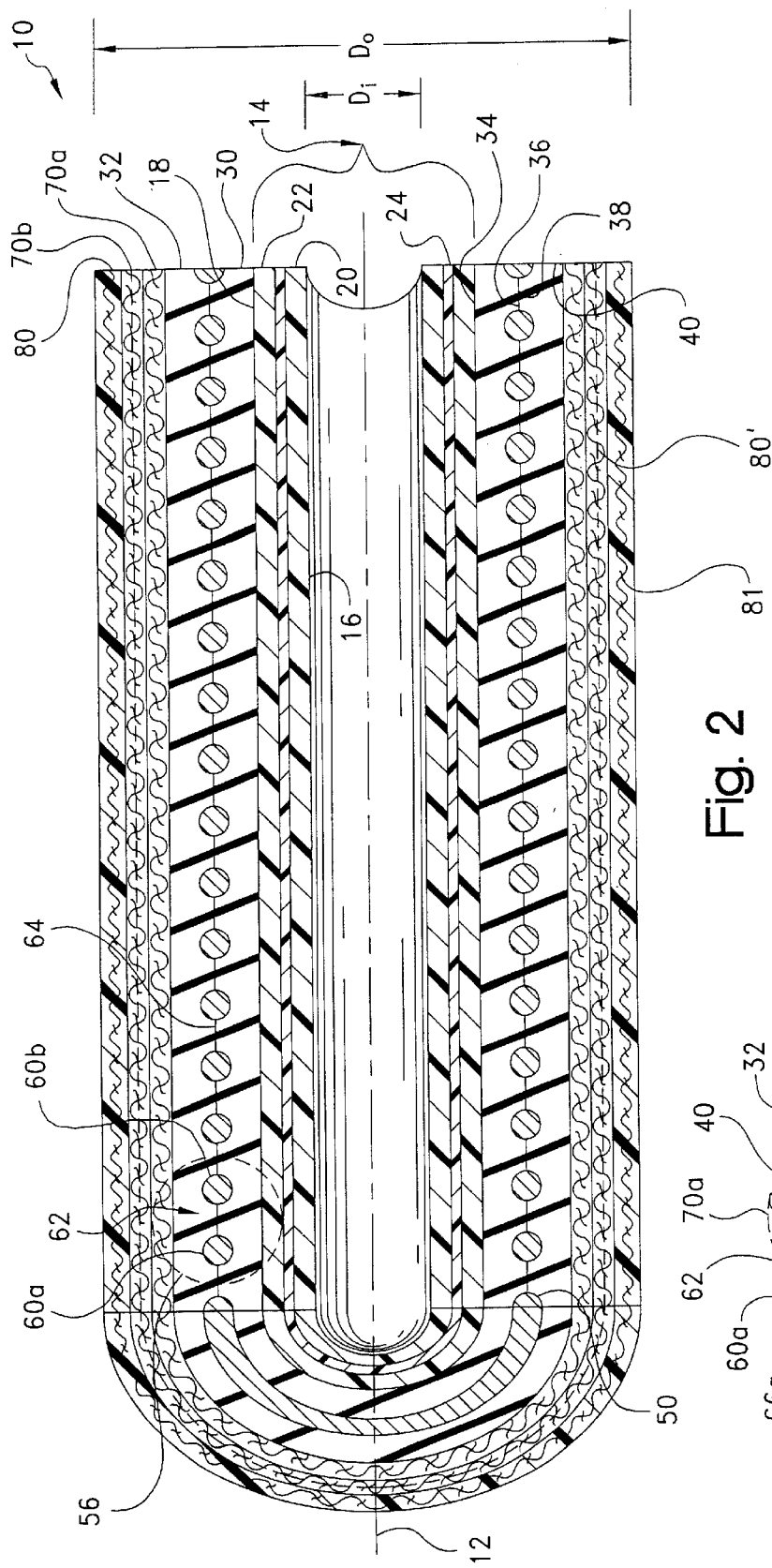
FIG. 2 is a view showing the hose construction of FIG. 1 both in radial and axial cross-section.

Referring then to the figures wherein corresponding reference numbers are used to designate corresponding elements throughout the several views, a representative collapse-resistant, high pressure hose according to the present invention is shown generally at 10 in the cut-away view of FIG. 1 and in the radial and axial cross-sectional view of FIG. 2. In basic dimensions, hose 10 extends axially to an indefinite length along a central longitudinal axis, 12, and has a select inner and outer diameter referenced, respectively, at "$D_i$" and "$D_O$" in the radial cross-sectional view of FIG. 2. The inner and outer diameter dimensions may vary depending upon the particular fluid conveying application involved, but generally will be between about 3/32–2 inch (0.24–5 cm) for inner diameter $D_i$, and about 0.30–2.8 inch 0.76–7.1 cm) for outer diameter $D_O$, with a overall wall thickness, "w," therebetween of between about 0.26–0.40 inch (0.66–1.0 cm).

As may be seen in the different views of FIGS. 1 and 2, hose 10 is constructed as being formed about a tubular core, referenced at 14. Conventionally, core tube 14 may be provided as extruded from a thermoplastic material, such as a polyolefin, polyester, fluoropolymer, polyvinyl chloride, thermoplastic rubber, or polyurethane, or, preferably, a polyamide such as Nylon 12, which is selected for chemical compatibility with the fluid being handled. Alternatively, core tube 14 may be extruded of a vulcanizable, i.e., thermosetting, or melt-processible, i.e., thermoplastic, natural or synthetic rubber such as SBR, polybutadiene, EPDM, butyl, neoprene, nitrile, polyisoprene, buna-N, copolymer rubber, or a blend such as ethylene-propylene rubber. Core tube 14 has an inner radial surface, 16, defining the inner diameter $D_i$ of the hose 10, and an outer radial surface, 18. As with the overall dimensions of hose 10, the wall thickness of core tube 14 may vary for the particular application envisioned, but typically will be between about 0.03–0.08 inch (0.76–2.0 mm).

Although core tube 14 may be formed of a unitary, single-layer construction, it is preferred for solvent flooding or other solvent transfer applications that the core tube 14 be provided, as shown, as having a composite, multi-layer construction. In such multi-layer construction, core tube 14 includes an innermost barrier layer or liner, 20, which defines the core inner radial surface 16, and an outermost layer, 22, which defines the core outer radial surface 18. For resistance to solvents such as methanol, barrier layer 20 may be provided as extruded or otherwise formed of a melt-processible, thermoplastic which may be a fluoropolymer. As used herein, "solvents" should be understood to include other alcohols and organic solvents or hydrocarbons, as well as inorganic solvents such as water or brine. Preferred fluoropolymers include polytetrafluoroethylene (PTFE), fluorinated ethylene polypropylene (FEP) copolymer, perfluoroalkoxy (PFA) resin, polychlorotrifluoroethylene (PCTFE) copolymer, ethylene-chlorotrifluoroethylene (ECTFE) copolymer, ethylene-tetraflurorethylene (ETFE) terpolymer, polyvinylidene fluoride (PVDF), polyvinylfluoride (PVF), and copolymers and blends thereof. For cost considerations, the wall thickness of barrier layer 20 may be maintained at the minimum necessary to provide the desired solvent permeation resistance, and for most applications will be between about 2–20 mils (0.05–0.5 mm).

Outermost layer 22, in turn, is provided as being formed of a relatively flexible, melt-processible thermoplastic polymeric material which may be a polyamide, polyolefin, polyvinyl chloride, or polyurethane, or a copolymer or blend thereof. Alternatively, outermost layer 22 may be formed of a thermosetting or thermoplastic rubber such as an alloyed rubber which is bondable directly to the liner 20, or another rubber which is bondable to liner 20 by means of a tie layer in a manner to be described hereinafter. For strength and flexibility considerations, the wall thickness of outer layer 22 may be thicker than that of inner layer 20, and typically will range from about 20 mils (0.5 mm) to about 60 mils (1.5 mm).

Core layers 20 and 22 may be fabricated by extrusion, co-extrusion, or sequential extrusion and, if formed of compatible materials, thereby cross-linked or otherwise chemically or fusion bonded together at their interface into an integral, tubular composite structure. If formed of chemically dissimilar or otherwise incompatible materials, however, an intermediate tie or bonding layer, 24, may be co-extruded, i.e., "tri-extruded," with layers 20 and 22 as being formed of a material which is adhesion bond compatible with both the materials of layers 20 and 22. Preferably, intermediate layer 24 is formed of material which also is resistant to solvent permeation, and which generally is more elastic than the material forming layer 20. Suitable materials include PVDF, PVF, polyvinyl acetate (PVA), urethanes, and copolymers, alloys, and blends thereof, as well as thermoplastic or thermosetting rubbers. The wall thickness of intermediate layer typically will be less than or about equal to the wall thickness of inner layer 20. Composites tubes of the type herein involved are further described in U.S. Pat. Nos. 3,561,493; 5,076,329; 5,167,259; 5,284,184; 5,383,087; 5,419,374; 5,460,771; 5,469,892; 5,500,257; 5,554,425; 5,566,720; 5,622,210; 5,678,611; and 5,743,304, and are marketed commercially by ITT Automotive, Inc. (Auburn Hills, Mich.) and by Pilot Industries, Inc. (Dexter, Mich.).

In accordance with the precepts of the present invention, core tube 14 is surrounded by a generally more flexible first elastomer layer, 30, which is superimposed radially circumferentially about the core outer surface 18, and a similarly flexible second elastomeric layer, 32, which surrounds the first elastomer layer 30. Each of elastomeric layers 30 and 32 has an inner radial surface, 34 and 36, respectively, and an outer radial surface, 38 and 40, respectively. In further accordance with the precepts of the present invention, a helical reinforcement element, 50, is spiral wound over the first elastomeric layer 30 and is interposed between layer 30 and the second elastomeric layer 32. Element 50 is structural in providing hose 10 with resistance to collapse from a high net positive external pressure such as may be developed from externally imposed forces as may be found within an underwater service environment, or from vacuum as may be found within suction applications.

Each of the first and second elastomeric layers 30 and 32, which actually each may be comprised of two or more separate layers, may be extruded or otherwise formed, independently, of a melt-processible or vulcanizable elastomeric material which specifically is selected for high temperature performance, flexibility, or otherwise for compatibility with the core tube 14. Suitable materials include natural rubbers such as Hevea and thermoplastic, i.e., melt-processible, or thermosetting, i.e., vulcanizable, synthetic rubbers such as fluoropolymer, chlorosulfonate, polybutadiene, butyl, neoprene, nitrile, polyisoprene, buna-N, copolymer rubbers such as ethylene-propylene (EPR), ethylene-propylene-diene monomer (EPDM), nitrile-butadiene (NBR) and styrene-butadiene (SBR), or blends such as ethylene or propylene-EPDM, EPR, or NBR. The term "synthetic rubbers" also should be understood to encompass materials which alternatively may be classified broadly as thermoplastic or thermosetting elastomers such as polyurethanes, silicones, fluorosilicones, styrene-isoprene-styrene (SIS), and styrene-butadiene-styrene (SBS), as well as other polymers which exhibit rubber-like properties such as plasticized nylons, polyesters, ethylene vinyl acetates, and polyvinyl chlorides. As used herein, the term "elastomeric" is ascribed its conventional meaning of exhibiting rubber-like properties of compliancy, resiliency or compression deflection, low compression set, flexibility, and an ability to recover after deformation, i.e., stress relaxation. In a preferred embodiment, first elastomeric layer 30 may be co-extruded with core tube 20 such that the inner radial surface 34 of layer 30 is fusion or otherwise integrally bonded to the core outer surface 18, with the second elastomeric layer being extruded over the first elastomeric layer in a subsequent operation following the spiral winding of element 50. Each of layers 30 and 32 may have a wall thickness of between about 0.005–0.310 inch (0.13–7.87 mm).

One or both of the layers 30 and 32 also may be formed as a closed-cell foam for further weight reduction, i.e., a decrease in specific gravity of 50% or more, and further improved flexibility. In this regard, the material forming the layers 30 and 32 may be mechanically or chemically foamed prior, during, or after its co-extrusion, molding, or other forming process. The foaming of the material may be generated under the control of a blowing agent, such as nitrogen, carbon dioxide, or other gas which is introduced into the material, or which is physically or chemically generated within the material from the reaction, decomposition, or volatilization of a blowing agent which may be an organic compound or an inorganic compound such as water.

With first elastomeric layer 30 being bonded to core tube 14, helical reinforcement element 50 is spiral wound under tension over the outer surface 38 of layer 30. In this regard, the extended spring-like element 50 may be provided as from between 1–20 axially spaced-apart, parallel strands or "ends" which may be monofilaments or multi-filament threads, yarns, or tapes. Each of these ends, in turn, may be individually spirally wound as issued from one or more separate spools or bobbins over the core 14 in a parallel orientation to form element 50.

In a preferred construction, element 50 is provided as one end of a monofilament carbon or stainless steel wire, which may be plastic coated, having a generally circular cross-section with a diametric extent of between about 0.015–0.30 inch (0.5–10 mm), and a tensile strength of between about 50,000–300,000 psi (345–2100 MPa). Element 50 alternatively may be provided as formed of a nylon, rigid polyvinyl chloride (PVC), aramid, or other polymeric or composite material. The element 50 is applied in one direction, i.e., either left or right hand, at a predetermined pitch angle, referenced at θ in FIG. 1, which may be measured relative to the longitudinal axis 12 of the hose 10. For typical applications, the pitch angle θ will be selected to be between about 40–85°.

Particularly, the pitch angle θ may be selected depending upon the desired convergence of strength, elongation, and volumetric expansion characteristics of hose 10. In general, higher pitch angles will result in decreased radial expansion of the hose under pressure, but in increased axial elongation. For high pressure applications, a "neutral" pitch angle of about 55° generally is preferred as minimizing elongation to about 3% of the original hose length. Alternatively, a pitch angle slightly greater than neutral may be employed to develop a radially-inwardly directed force component for more efficient load transfer.

Figure 3:
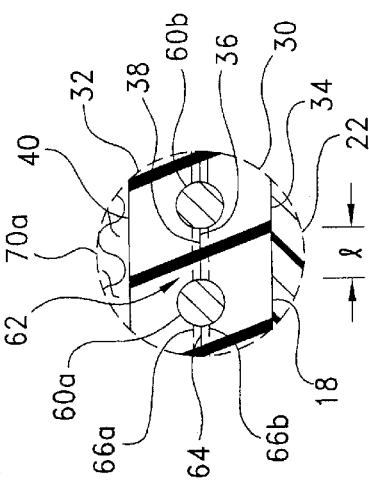
FIG. 3 is an axial cross-sectional view of the encapsulated reinforcement element of the hose construction of FIG. 2 which is magnified to reveal the details of the structure thereof.

Helical element 50, as may be seen best in the cut-away view of FIG. 2 and in the magnified view of the hose portion referenced at 56 shown in FIG. 3, further is applied over the core 14 at less than 100% coverage thereof, and preferably at a coverage of between about 30–85%. In this way, the open helix so formed is defined by a series of turns, a pair of which is referenced at 60a–b. With momentary reference particularly to the magnified axial cross-sectional view shown at 56 in FIG. 3, each of these turns may be seen to be spaced-apart by an axial distance or lead, referenced at "l," of between about 0.1–3.5 inch (0.25–9 cm) from an adjacent turn to define successive turn pairs 60. An interstitial area, referenced at 62, thereby is defined between the adjacent turns in each of these pairs 60. With the element 50 being provided, as is shown, as having a generally circular cross-sectional geometry, the interstitial area 62 defined between the adjacent turns pairs 60 normally will assume a generally hyperbolic cross-sectional geometry. Wire element 50 alternatively may be provided as having a "flat-wire" construction with a polygonal cross-sectional geometry which may be generally rectangular or square, or with another circular geometry which may be oval or elliptical.

With continuing reference to FIG. 2 and particularly to the magnified view of FIG. 3, wire element 50 may be seen to be spiral wound over the first elastomeric member 30 such that first outer radial surface 38 thereof is plastically deformed or is otherwise extended into the interstitial area 62. Similarly, with the second elastomeric layer 32 being extruded or otherwise formed over the wound element 50, the second inner radial surface 36 of layer 32 is made to flow or otherwise extend into the interstitial area 62 to define an interface, referenced at 64, with the first outer radial surface 38 of first elastomeric layer 30. In this way, each of the turns 60 of helical element 50 is encapsulated between layers 30 and 32 to form an integral, collapse-resistant reinforcement structure.

Although elastomeric layers 30 and 32 may be formed of different elastomeric materials, it is preferred for ease of manufacturing that each is formed of the same material, or at lease compatible materials which may be bonded thermally by fusion, or chemically by cross-linking or other reactive bonding. A particularly preferred material for layers 30 and 32 is a melt-processible, thermoplastic polyurethane elastomer (TPE). With the intermediate hose structure of core 14, first elastomeric layer 30, and reinforcement element 50 being preheated, second elastomeric layer 32 may be cross-headed extruded using pressure tooling or the like over layer 30 and element 50 such that the second inner surface 36 of layer 32 is made to flow or is otherwise deformed into the interstitial area 62 and contact with the first elastomeric layer 30.

Advantageously, with the second elastomeric layer 32 being extruded under pressure, a fusion bond may be effected with first elastomeric layer 30 thereby forming an integral encapsulating structure. Alternatively, for chemically dissimilar layers 30 and 32, an intermediate bonding or tie layer, represented in phantom in FIG. 3 by lines 66a–b, may be provided as formed of an adhesive or compatibilizing polymer. In a preferred embodiment, each of layers 20, 22, 24, 30, and 32 are integrally fusion or adhesively bonded, or vulcanized, to form a structural composite with the bond strengths between adjacent, i.e., contiguous, layers 20, 22, 24, 30 and 32 each exceeding 15 lbs/linear inch (2.7 kg/cm).

The encapsulation of helical element 50 within elastomeric members 30 and 32 ensures the efficient transfer of stress thereto, and also locks the helix pitch in place while otherwise allowing the hose to flex consistently to its minimum bend radius which may be between about 2.5–36 inch (6.5–91.5 cm) depending upon the hose outer diameter. Such encapsulation, moreover, eliminates the need to provide a second, contra-helically wound element which would be necessary to counterbalance the torsional twisting which otherwise could occur when the hose 10 is pressurized. With the helix element 50 so maintained, both the axial elongation and diametric expansion of the hose 10 are controlled for improved structural strength.

With helical element 50 being encapsulated within elastomeric layers 30 and 32, layer 32 thereby is formed as having a generally smooth, i.e., cylindrical or even, second outer radial surface 40. Such surface 40, which is generally smooth with respect to both the radial and longitudinal directions, advantageously provides for the efficient transfer of internal loads, and for an even base over which optional fibrous reinforcement layers subsequently may be wound, braided, or otherwise provided for increasing the internal pressure resistance of hose 10. That is, stresses which may be induced from internal pressure or otherwise are efficiently transferred to the reinforcement layers by virtue of the smooth surface 40.

Preferably, and as is shown in FIGS. 1 and 2, at least two such fibrous reinforcement layers, 70*a–b*, are provided over second elastomeric layer 30. As is shown, each of fibrous reinforcement layers 70 may be conventionally formed as braided or, alternatively as spiral wound or knitted, of from 1 to about 20 ends of monofilament, continuous multifilament, i.e., yarn, thread, tape, or ply, or short "staple" strands of a natural or synthetic fiber material, which may be a nylon, cotton, polyester, aramid, polyvinyl acetate (PVA), or polyphenylene bezobisoxazole (PBO), or a steel or other metal wire material, or a blend thereof. With respect to spiral wound layers, such layers may be oppositely wound in pairs so as to counterbalance any torsional twisting effects. In a preferred construction, each of the reinforcement layers is braided at a pitch angle of between about 48–60° using from between 24–96 carriers each having from 1 to about 24 ends of a 720–6000 denier (800–6600 decitex), multi-filament aramid yarn. For spiral wound layers, from 1 to about 12 ends may be wound as having a twist of between 0 and about 200 turns per meter which may be in either the clockwise or counterclockwise direction as supplied by the manufacturer, i.e., manufacturer's twist, or as is imparted as the strands are spooled. As is known in the art, the fiber twist may be varied, for example, to optimize the flexural fatigue resistance of the hose or to minimize the hose diameter or cost.

Although natural or other synthetic fibers, such as polyesters and other polyamides such as nylons, may be substituted, an aramid material generally is to be considered preferred as affording, as compared to such other fibers, superior load bearing and dimensional stability, both radial and axial, within the hose constructions herein involved. In this regard, aramid fibers, as marketed commercially under the tradenames Kevlar® and Nomex® (E. I. DuPont de Nemours and Co., Wilmington, Del., USA), Technora® (Teijin Ltd., Tokyo, Japan), and Twaron® (Akzo Nobel, Arnhem, The Netherlands), exhibit a relatively high tensile modulus or tenacity of about 190 cN/tex and a relatively low stretch with an elongation at break of about 3%.

To better control the elongation and contraction of hose 10, and for improve impulse life, at least the innermost, 70*a*, of reinforcement layers 70 is bonded to the corresponding outer radial surface 40 of the second elastomeric layer 32. Preferably such bond will exhibit a strength of at least about 8 lbs/inch (1.43 kg/cm), and may be effected by solvating elastomeric layer 32 with an appropriate solvent such as n-methyl pyrrolidone or with the use of a urethane or other adhesive having an affinity to the materials forming layers 32 and 70.

The outermost reinforcement layer 70*b*, in turn, is sheathed within a coaxially surrounding protective cover or jacket, 80. Cover 80 may be cross-head or otherwise conventionally extruded, or wrapped or braided over the reinforcement layer 70*b* as a 0.020–0.15 inch (0.5–3.8 mm) thick layer, tape, or braid of an abrasion-resistant, preferably melt-processible, thermoplastic material such as a polyamide, polyolefin, polyester, polyvinyl chloride, or, most preferably, a thermoplastic polyurethane (TPU) elastomer. By "abrasion-resistant," it is meant that such thermoplastic material for forming cover 30 has a hardness or durometer of between about 60–95 Shore A. As with core 14, cover 80 alternatively may be formed of a vulcanizable natural or synthetic rubber such as SBR, polybutadiene, EPDM, butyl, neoprene, nitrile, polyisoprene, silicone, fluorosilicone, buna-N, copolymer rubbers, or blends such as ethylene-propylene rubber. Cover 80 may be bonded to the outermost reinforcement layer 70*b* either mechanically or with a urethane or other adhesive material. In a preferred embodiment, each of the layers of hose 10 is bonded to its immediately succeeding layer so as to provide for the more efficient transfer of induced internal or external stresses.

Particularly for offshore oil drilling applications employing an underwater camera inspection system for the hose, it is preferred that the cover 80 be colored so as to contrast with the color of the sea water when lighted by a sodium-arc lamp or other source. Typically, the colors orange, blue, yellow and white will provide the most contrast, while the colors black and green generally will provide the least contrast and therefore may not be preferred for these applications. In this regard, one or more pigments, dyes, or other colorants may be admixed or otherwise incorporated into the formulation of the material forming the cover 80 to provide the desired coloration. Such colorants may include organic or inorganic pigments such as titanium dioxide, chromium oxide, iron oxide, lead chromates and molybdates, metallic complexes, phthalocyanine blue, and carbon black, dyes such as azo or other conjugate compounds, special colorants such as coated micas and other pearlescent pigments, metal flake pigments, fluorescent ("day-glo") pigments which absorb and re-emit UV or visible light, phosphorescent or other luminescent pigments which are excited by UV or visible light and continue to emit after the extinction of the radiation source, reflectants such as solid or hollow glass microspheres, and blends of one or more of the foregoing. Typically, these such other fillers and additives are blended or otherwise admixed with the formulation, and may comprise between about 0.05–80% or more by total volume thereof. In the case of the addition of a dye, such dye typically may comprise between about 1% by total weight of the formulation.

In an alternative arrangement, a secondary cover, referenced in phantom at 80' in FIG. 1, may be interposed between the reinforcement layers 70*a–b*, which as before may be conventionally braided, i.e., woven, or wound, knitted, or otherwise formed such as by needling or wrapping, so as to surround the layer 70*a* and, in turn, to be surrounded by the layer 70*b*. As was cover 80, which may be the outermost layer of the hose 10 or which itself may be sheath in a chafe guard, fire sleeve, or other covering or jacket, secondary cover 80' may be cross-head or otherwise conventionally extruded, or wrapped or braided over the reinforcement layer 70b as a 0.02–0.15 inch (0.5–3.8 mm) thick layer, tape, or braid of an abrasion-resistant, preferably melt-processible, thermoplastic material such as a polyamide, polyolefin, polyester, polyvinyl chloride, or, most preferably, a thermoplastic polyurethane (TPU) elastomer. Secondary cover 80' alternatively may be formed of a another polymeric material such as a vulcanizable natural or synthetic rubber such as SBR, polybutadiene, EPDM, butyl, neoprene, nitrile, polyisoprene, silicone, fluorosilicone, buna-N, copolymer rubbers, or a blend such as ethylene-propylene rubber. Similar to cover 80, secondary cover 80' may be bonded, such as by means of fusion, mechanical, chemical, or adhesive bonding, or a combination thereof or otherwise, to the reinforcement layer 70a and/or to layer 70b. Although layer 70a is shown in FIG. 1 to be an innermost reinforcement layer and layer 70a is shown to be an outermost reinforcement layer, it should be understood that additional reinforcement layers 70 may be provided over or under the layers 70a–b, and that addition inner cover layers 80' may be interposed between one or more of each successive pair of the additional reinforcement layers 70.

Advantageously, in harsh service environments such as may be found in offshore oil drilling applications, the secondary cover 80' functions as an internal barrier against the ingress of fluids, such as sea water, should the primary cover 80 be damaged or damaged or removed. Without the secondary cover 80', the sea water or other fluid otherwise would have a tendency to penetrate through the reinforcement layers 70 and to exert an external pressure on the core tube 14. Should the core tube 14 lose internal pressure, or be subject to a net external pressure, i.e., the hydrostatic head pressure of the underwater depth exceeding the hose internal pressure, the core tube could, in some instances, collapse notwithstanding that the reinforcement layers 70 are otherwise undamaged and remain intact. With the addition of the secondary cover 80', the penetration of sea water or other fluid through the reinforcement layer 70b is prevented. The secondary cover 80', moreover, may also be used as an adhesive to bond the layer 70a to the layer 70b or further improved collapse and kink resistance of the hose 10.

As was one or both of the layers 30 and 32, secondary cover 80' also may be formed as a closed-cell foam for further weight reduction, i.e., a decrease in specific gravity of 50% or more, and further improved flexibility. In this regard, the material forming the layer of the cover 80' may be mechanically or chemically foamed prior, during, or after its coextrusion, molding, or other forming process. The foaming of the material again may be generated under the control of a blowing agent, such as nitrogen, carbon dioxide, or other gas which is introduced into the material, or which is physically or chemically generated within the material from the reaction, decomposition, or volatilization of a blowing agent which may be an organic compound or an inorganic compound such as water.

Of course, even with the addition of the secondary cover 80', it is neither desired nor intended that the primary reinforcement layer 80 be cut, abraded, or otherwise damaged. Accordingly, the thermoplastic or other material of one or both of the covers 80 and 80' may be compounded, as is shown at 81 in FIG. 2 for cover 80, with a fiber reinforcement for increased abrasion, cut, and tear resistance. The fiber may be incorporated into a continuous or matrix phase of the thermoplastic or other polymeric material as a filler or other dispersed phase such as in the form of a pulp or staple fiber, or a blend thereof. Alternatively, the fiber may be incorporated as an embedded woven, wound, braid, knit, needled, wrapped or other layer which may be mechanically and/or chemically bonded to the polymeric material. The fiber material, which may be the same or different in the layers 80 and 80', may be a natural or synthetic polymeric material such as a nylon, cotton, polyester, polyamide, aramid, polyolefin, polyvinyl alcohol (PVA), polyvinyl acetate, carbon fiber, or polyphenylene bezobisoxazole (PBO), or blend, a steel, which may be stainless or galvanized, brass, zinc or zinc-plated, or other metal wire, or a combination thereof. Generally, however, fibers such as para or meta-aramid pulp or staple fibers, PBO pulp or staple fibers, and carbon staple fibers may be considered preferred for many applications and may be employed to increase the abrasion resistance of the cover by up to 300% or more as compared to a conventional, unfilled material. In the case of a staple or pulp, the fiber may be loaded at between about 0.01–50% by weight based on the total weight of the formulation, and as may depend upon the method used or desired to be used to form the covers inasmuch as higher loading concentrations increase the viscosity of the material which is to be processed.

Thus, an illustrative hose construction is described which results in efficient load transfer between the respective component layers thereof. Such a construction, which may be entirely thermoplastic, rubber, or a combination thereof, is particularly adapted for high pressure, solvent transfer applications and, as a result of a unique reinforcement construction, is believed to exhibit improved flexibility, collapse resistance, and performance life as compared to the hoses heretofore known in the art.

Although the illustrative hose construction 10 has been described wherein the composite reinforcement of the present invention is disposed as an innermost layer about core 14, other arrangements may be envisioned based upon the disclose contained herein. For example, two or more composite reinforcement layers may be provided either as innermost or intermediate layers. In particular, one or more intermediate reinforcement layers may be interposed between the core and a first composite layer and without departing from the scope of the invention herein involved. Also, the secondary cover and/or the filled cover layers may be used with or without the described composite reinforcement layer.

Figure 4:
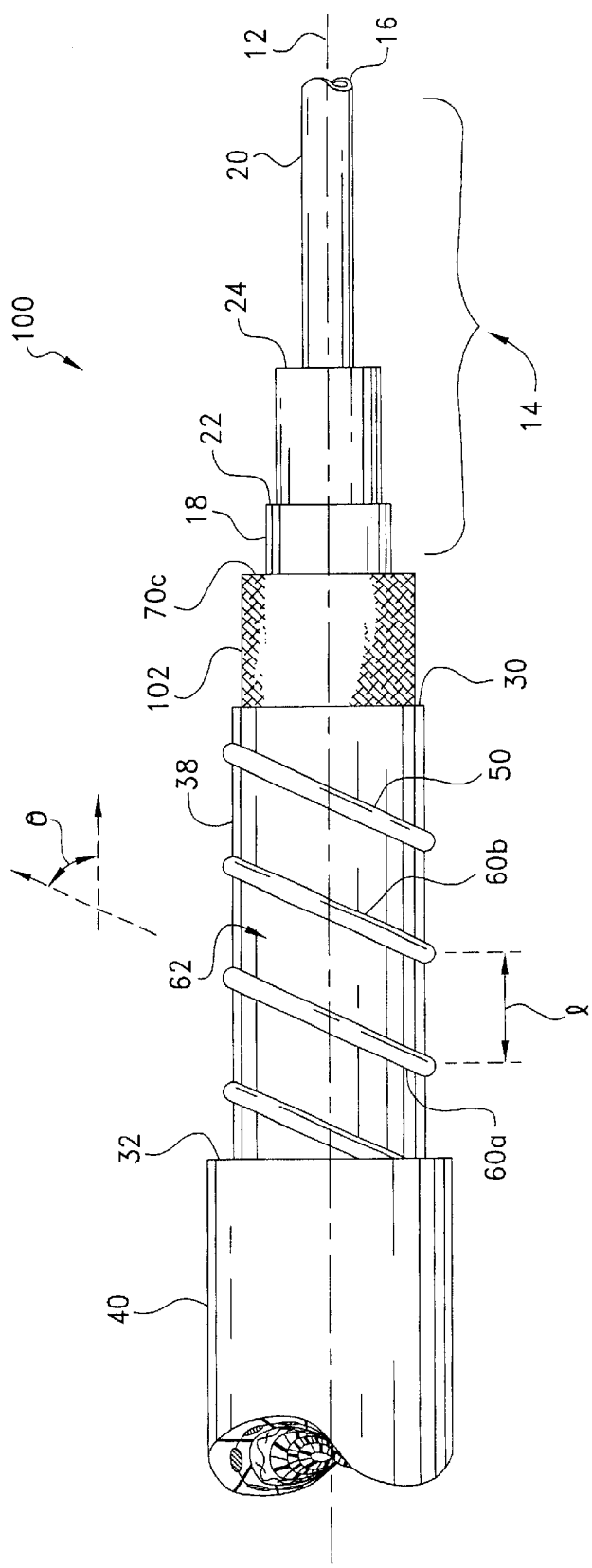
FIG. 4 is a side elevational, cut-away view of an alternative embodiment of the hose construction of FIG. 1.

Looking next to FIG. 4, a representative one of these alternative embodiments of hose 10 of FIG. 1 is referenced generally at 100. In basic construction, hose 100 is similar to that of hose 10 with the exception that one or more fibrous reinforcement layers 70, one of which is referenced at 70c, are provided directly over the outermost layer 22 of core tube 14, with the first elastomeric layer 30 being provided as an intermediate jacket over the outer surface, 102, of the reinforcement layer 70c. It will be appreciated that hose 100 is a somewhat simplified construction of hose 10 in that core tube 14, reinforcement layer 70c, and layer 30 may be formed as a unit with reinforcement element 50 and second elastomeric layer 40, which now functions as the outermost jacket for the hose 100, be formed in a separate operation.

Figure 5:
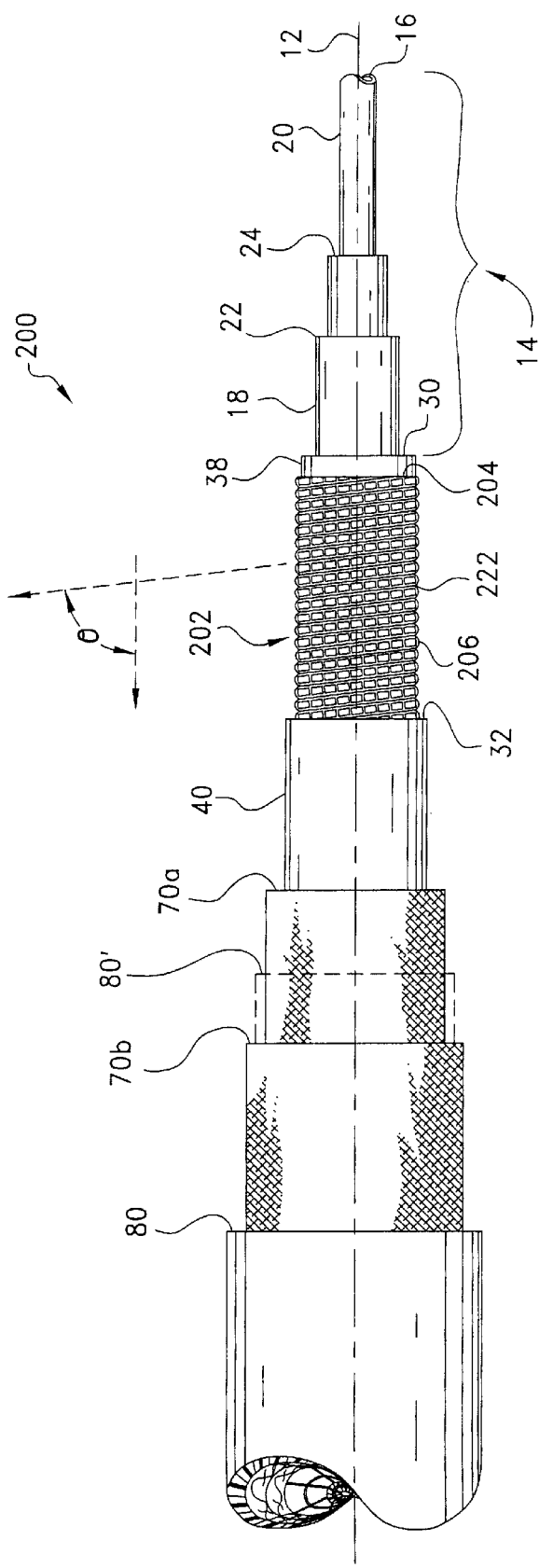
FIG. 5 is a side elevational, cut-away view of an another alternative embodiment of the hose construction of FIG. 1.
Figure 6:
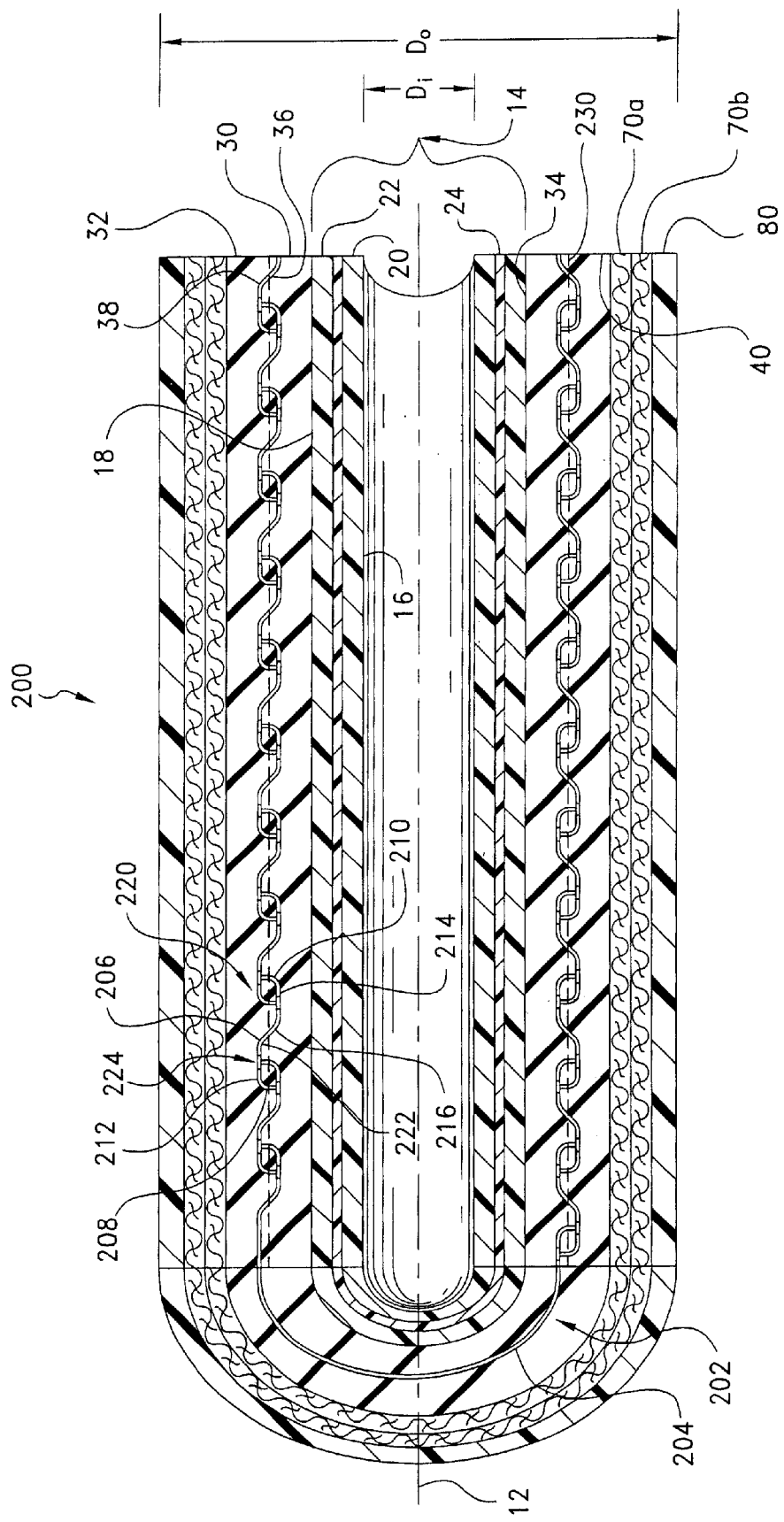
FIG. 6 is a view showing the hose construction of FIG. 5 both in radial and axial cross-section.

Considering lastly FIGS. 5 and 6, another representative alternative embodiment of hose 10 of FIG. 1 is referenced generally at 200. Again, hose 200 is similar in basic construction to that of hose 10 with the exception that helical reinforcement element 50 is provided as a spiral wound armor casing, referenced generally at 202, of the type which is described further in U.S. Pat. Nos. 5,143,123; 4,862,924; 4,620,569; 4,739,801; 4,396,797; 4,213,485; and 3,908,703.

In the hose construction 200, which also may include the secondary cover or jacket again referenced in phantom at 80', armor casing 202 is spiral wound from an aluminum, steel, or other metal strip, 204, to define a series of cylindrical links, one of which is referenced at 206. As may be seen best in the cross-sectional view of FIG. 6, strip 204 is rolled, stamped, passed through a die, or otherwise formed such that each of the links 206 includes a downturned portion, 208, defined at one edge of the strip 204, and an upturned portion, 210, defined at the other edge of the strip 204. An upper, 212, and lower, 214, wall portion each extends, respectively, from the downturned and upturned portions, and are joined at an intermediate side wall portion, 216.

The upturned portion 208 of each of the links 206 is interlocked as at 220 with the downturned portion of an adjacent link 206 so as to form a generally continuous, yet flexible casing 202. Preferably, one or both the upper and lower wall portions 212 and 214 are formed as having one or more apertures, one of which is referenced at 222. As may be seen best again in the cross-sectional view of FIG. 6, an interstitial area, 224, is defined by each of the apertures 222. With strip 204 being spiral wound over the first elastomeric member 30, the first outer radial surface 38 thereof may be plastically deformed or is otherwise extended into the interstitial areas 224. Similarly, with the second elastomeric layer 32 being extruded or otherwise formed over the strip 204, the second inner radial surface 36 of layer 32 may be made to flow or otherwise extend into the interstitial areas 224 to define an interface, referenced in phantom at 230, with the first outer radial surface 38 of first elastomeric layer 30. In this way, each of the links 206 of casing 202 is encapsulated between layers 30 and 32 to form an integral, collapse-resistant reinforcement structure.

As it is anticipated that certain changes may be made in the present invention without departing from the precepts herein involved, it is intended that all matter contained in the foregoing description shall be interpreted as illustrative and not in a limiting sense. All references cited herein are expressly incorporated by reference.

What is claimed is:

1. A tubular hose construction comprising:
   an first reinforcement layer formed of a first fiber material;
   an inner jacket surrounding the first reinforcement layer;
   a second reinforcement layer surrounding the inner jacket and formed of a second fiber material;
   an outer jacket covering the second reinforcement layer;
   a first elastomeric layer having a first inner radial surface, and a first outer radial surface;
   a helical reinforcement element spiral wound over the first elastomeric layer at a predetermined pitch angle measured relative to the longitudinal axis; and
   a tubular second elastomeric layer surrounding the helical reinforcement element and surrounded by the first reinforcement layer, the second elastomeric layer having a second inner radial surface and a second outer radial surface, the helical reinforcement element being encapsulated between the first outer radial surface of the first elastomeric layer and the second inner radial surface of the second elastomeric layer.

2. The hose of claim 1 wherein the inner jacket bonds the first reinforcement layer to the second reinforcement layer.

3. The hose of claim 1 wherein the first reinforcement layer is an innermost reinforcement layer.

4. The hose of claim 1 wherein the second reinforcement layer is an outermost reinforcement layer.

5. The hose of claim 4 wherein the first reinforcement layer is an innermost reinforcement layer.

6. The hose of claim 5 wherein the inner jacket bonds the first reinforcement layer to the second reinforcement layer.

7. The hose of claim 1 wherein the inner jacket and the outer jacket each comprises a layer of polymeric material.

8. The hose of claim 7 wherein the polymeric material is selected, independently, from the group consisting of polyurethanes, polyamides, polyolefins, silicones, polyvinyl chlorides, polyurethanes, natural and synthetic rubbers, and copolymers and blends thereof.

9. The hose of claim 7 wherein the polymeric material is a closed-cell foam.

10. The hose of claim 1 wherein each of the reinforcement layers is braided or spiral wound.

11. The hose of claim 1 wherein the first and the second fiber material each is selected, independently, from the group consisting of nylons, polyesters, aramids, polyphenylene bezobisoxazoles, metal wires, and combinations thereof.

12. The hose of claim 7 wherein the outer jacket forms the outermost layer of the hose.

13. The hose of claim 12 wherein at least the outer jacket further comprises a layer of a third fiber material embedded within the layer of the polymeric material.

14. The hose of claim 13 wherein the layer of the third fiber material is braided, knitted, or spiral wound.

15. The hose of claim 12 wherein at least the layer of polymeric material forming the outer jacket is filled with a third fiber material.

16. The hose of claim 1 wherein the helical reinforcement element is spiral wound to define a series of turns each being spaced-apart from an adjacent one of the turns to define an interstitial area therebetween, the first outer radial surface of the first elastomeric member extending into the interstitial area, and the second inner radial surface of the second elastomeric member extending into the interstitial area and being bonded therein to the first inner radial surface to encapsulated each of the turns of the helical reinforcement element.

17. The hose of claim 1 further comprising a core having an inner radial surface defining the inner diameter of the hose and an outer radial surface, the core being surrounded by the first elastomeric layer with the first inner radial surface thereof being bonded to the outer radial surface of the core.

18. The hose of claim 17 wherein the core is formed of a thermoplastic material selected from the group consisting of polyamides, polyolefins, fluoropolymers, polyvinyl chloride, polyurethanes, and copolymers and blends thereof.

19. The hose of claim 17 wherein the core is a composite which comprises at least an innermost layer which defines the inner radial surface of the core, and an outermost layer which defines the outer radial surface of the core.

20. The hose of claim 19 wherein the innermost layer is formed of a polymeric material which is resistant to solvents, and wherein the outermost layer is formed of a flexible polymeric material.

21. The hose of claim 20 wherein the polymeric material which is resistant to solvents comprises a fluoropolymer, and wherein the flexible polymeric material is selected from the group consisting of polyamides, polyolefins, polyvinyl chlorides, polyurethanes, and copolymers and blends thereof.

22. The hose of claim 21 wherein the core further comprises an intermediate layer interposed between the innermost and outermost layer and bonding the innermost layer to the outermost layer.

23. The hose of claim 22 wherein the intermediate layer is formed of a polymeric material selected from the group consisting of polyvinylidene fluorides, polyvinyl fluorides, polyvinyl acetates, polyurethanes, and copolymers and blends thereof.

24. The hose of claim 1 wherein the helical reinforcement element is wound of one or more ends of a metal, monofilament wire.

25. The hose of claim 24 wherein the wire is formed of a steel material having a tensile strength of between about 50,000–300,000 psi (345–2100 MPa).

26. The hose of claim 24 wherein the wire has a generally circular, elliptical, or polygonal cross-sectional geometry with a diametric extent of between about 0.015–0.30 inch (0.5–10 mm).

27. The hose of claim 16 wherein the pitch angle is between about 40–85°, and wherein each of the turns is spaced-apart from an adjacent turn by between about 0.1–3.5 inch (0.25–9 cm).

28. The hose of claim 1 wherein the first reinforcement layer is bonded to the second outer radial surface of the second elastomeric layer.

29. The hose of claim 28 wherein the second outer surface of the second elastomeric layer is generally smooth.

30. The hose of claim 17 wherein the first inner radial surface of the first elastomeric layer is fusion bonded to the outer radial surface of the core.

31. The hose of claim 16 wherein the second inner radial surface of the second elastomeric layer is fusion bonded to the first outer radial surface of the first elastomeric member.

32. The hose of claim 1 wherein the first and the second elastomeric member each is formed of an elastomeric material selected, independently, from the group consisting of natural and synthetic rubbers.

33. The hose of claim 32 wherein the first and the second elastomeric member each is formed of the same elastomeric material.

34. The hose of claim 1 wherein the helical reinforcement element is wound to define a series of links, each of the links being interlocked with a adjacent one of the links.

35. The hose of claim 34 wherein each of the links has at least one aperture formed therethrough to define an interstitial area, the first outer radial surface of the first elastomeric member extending into the interstitial area, and the second inner radial surface of the second elastomeric member extending into the interstitial area and being bonded therein to the first inner radial surface to encapsulated each of the links of the helical reinforcement element.

36. The hose of claim 32 wherein the elastomeric material forming one or both of the first and the second elastomeric member is a closed-cell foam.

37. The hose of claim 14 wherein the third fiber material is selected independently, from the group consisting of aramids, carbon, and polyphenylene bezobisoxazoles, and a combination thereof.

38. The hose of claim 15 wherein the third fiber material comprises staple fibers, pulp fibers, or a blend thereof.

39. The hose of claim 38 wherein the third fiber material is selected independently, from the group consisting of aramids, carbon, and polyphenylene bezobisoxazoles, and combinations thereof.

* * * * *